US 008974866 B2

(12) United States Patent
Jorro de Inza et al.

(10) Patent No.: US 8,974,866 B2
(45) Date of Patent: Mar. 10, 2015

(54) PROCESS FOR MANUFACTURING AN INNER FLOCKED COATING FOR VEHICLES WITH A TWO-COLOUR EFFECT

(71) Applicant: Grupo Antolin Ingenieria, S.A., Burgos (ES)

(72) Inventors: Alejandro Jorro de Inza, Burgos (ES); Adelaida Antolin Fernandez, Burgos (ES); German Sanchis Gramage, Agullent Valencia (ES)

(73) Assignee: Grupo Antolin Ingenieria, S.A., Burgos (ES)

( * ) Notice: Subject to any disclaimer, the term of this patent is extended or adjusted under 35 U.S.C. 154(b) by 0 days.

(21) Appl. No.: 13/871,715

(22) Filed: Apr. 26, 2013

(65) Prior Publication Data

US 2013/0276953 A1    Oct. 24, 2013

Related U.S. Application Data

(62) Division of application No. 12/815,561, filed on Jun. 15, 2010.

(30) Foreign Application Priority Data

Jul. 28, 2009  (EP) .................................... 09382125

(51) Int. Cl.
*B05D 1/16* (2006.01)
*B05D 1/14* (2006.01)
*B05D 3/06* (2006.01)
*B05D 5/06* (2006.01)
*B60R 13/02* (2006.01)

(52) U.S. Cl.
CPC .. *B05D 1/16* (2013.01); *B05D 1/14* (2013.01); *B05D 5/06* (2013.01); *B60R 13/02* (2013.01)
USPC ........... 427/464; 427/206; 427/264; 427/462; 427/554

(58) Field of Classification Search
USPC .......................... 427/206, 264, 462, 464, 554
See application file for complete search history.

(56) References Cited

U.S. PATENT DOCUMENTS

| | | | |
|---|---|---|---|
| 3,591,403 A * | 7/1971 | Sheehan | 427/463 |
| 4,018,956 A | 4/1977 | Casey | |
| 4,201,810 A | 5/1980 | Higashiguchi | |
| 6,110,560 A | 8/2000 | Abrams | |
| 6,633,019 B1 * | 10/2003 | Gray | 219/121.71 |
| 8,245,716 B2 | 8/2012 | Malvar et al. | |
| 8,323,161 B2 | 12/2012 | Berens et al. | |
| 2004/0018037 A1 | 1/2004 | Gueret | |

(Continued)

OTHER PUBLICATIONS

Office Action received in corresponding U.S. Appl. No. 12/815,561 issued on Oct. 28, 2013.

(Continued)

*Primary Examiner* — Frederick Parker
(74) *Attorney, Agent, or Firm* — Banner & Witcoff, Ltd.

(57) ABSTRACT

This invention relates to a process for the manufacture of an inner flock coating for vehicles with an indicative and/or decorative motif, which inner flock coating is made up of a support, an adhesive layer and a flock layer made up of a set of fibers adhered to the support via the adhesive layer, wherein said motif is located on a visible surface of said inner coating and wherein said motif is performed by the combination of at least two visibly different areas of the coating, a first area and a second area on which a laser beam is applied.

20 Claims, 3 Drawing Sheets

(56) References Cited

U.S. PATENT DOCUMENTS

| | | | |
|---|---|---|---|
| 2005/0151302 A1* | 7/2005 | Latos et al. | 264/497 |
| 2005/0285121 A1 | 12/2005 | Kim | |
| 2008/0060669 A1 | 3/2008 | Malvar et al. | |
| 2008/0095973 A1 | 4/2008 | Abrams | |
| 2008/0150186 A1 | 6/2008 | Abrams | |
| 2008/0302772 A1 | 12/2008 | Lion | |
| 2009/0269544 A1 | 10/2009 | Morrison | |
| 2010/0154978 A1 | 6/2010 | Berens et al. | |
| 2011/0052859 A1 | 3/2011 | Abrams | |
| 2012/0327673 A1 | 12/2012 | Ureta Hortiguela et al. | |

OTHER PUBLICATIONS

C.L. Beyer and M.M. Hirschler, "Thermal Decomposition of Polymers," Chapter 7 in SFPE Handbook of Fire Protection Engineering, 2001, MFPA, Quincy MA, 3rd Ed., pp. 1-110 to 1-131.

"Selected Thermal Properties" webpage printout from Polymer Science Learning Center at University of Southern Mississippi, http://pslc.ws/fire/howwhy/thermalp.htm, Oct. 21, 2013.

Office Action received in corresponding U.S. Appl. No. 12/815,561 issued on Apr. 18, 2013.

* cited by examiner

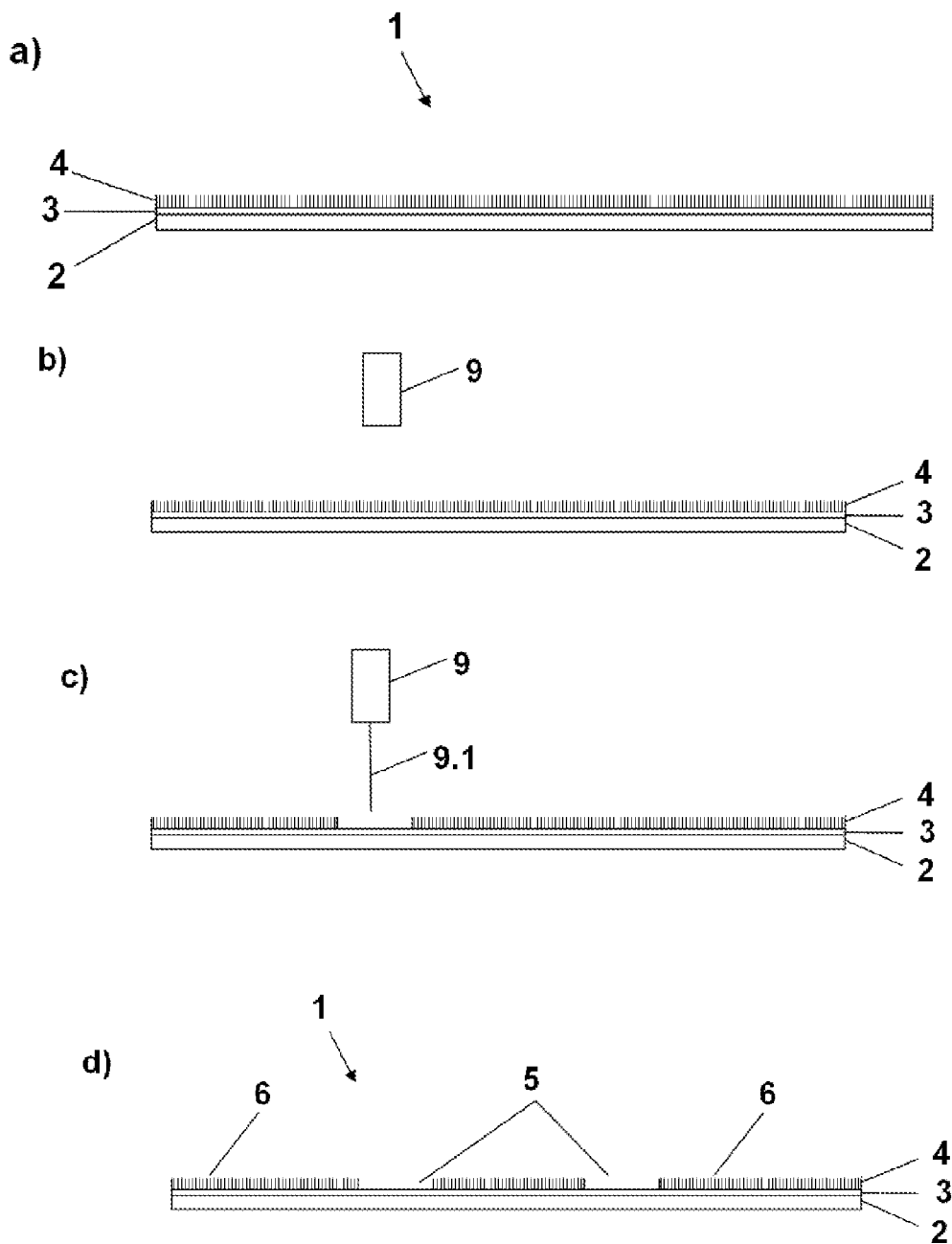

PROCESS FOR MANUFACTURING AN INNER FLOCKED COATING FOR VEHICLES WITH A TWO-COLOUR EFFECT

The present application is a divisional application of U.S. application Ser. No. 12/815,561 filed Jun. 15, 2010; which claims foreign priority of EP 09382125.4 filed Jul. 28, 2009, the contents therein of both applications is incorporated by reference herein in its entirety.

OBJECT OF THE INVENTION

The present invention relates to a process for the manufacture of an inner flock coating for vehicles with an indicative and/or decorative motif of the ones made up of at least one flock layer formed by projecting a series of fibres over a support by flocking, such that said fibres remain adhered to said support via an adhesive layer placed over it.

The invention is characterised by performing said indicative and/or decorative motif on said inner coating by the action of a laser light beam on the fibres forming the flock layer, such that it eliminates part of the flock layer due to a temperature increase when aiming a laser light beam on said flock layer, revealing the adhesive layer.

BACKGROUND OF THE INVENTION

Flocking is a special technology intended to coat a surface decoratively. This technology allows applying fibres by fixing them to a support material that has previously been coated with an adhesive. To do this, an adhesive is applied on a support, over which adhesive layer short fibres called flock are projected in order to form a flock layer.

The use of flock coatings is known for application in inner vehicle parts, particularly in automotive vehicles, such as sunshades, pillars, roof, door and seat trimmings, for example. One example is German patent document DE 3622263.

These coatings can be applied mainly in two ways, by flocking a support the configuration of which has two dominant dimensions for its subsequent application on a formed workpiece, called two-dimensional flocking, or by its direct application upon the surface of a three-dimensional workpiece, called three-dimensional flocking.

In the first case, we start from a two-dimensional laminated support, a textile support for example, to which an adhesive layer is applied. Subsequently, by means of an electrostatic flocking process consisting in projecting the fibres forming the flock layer onto an adhesive layer through an electrostatic field so as to make them all face the same direction, for example, these fibres are distributed with an orientation that is perpendicular to the support.

Finally, the adhesive is subjected to a drying process and the flock surface is cleaned in order to eliminate any fibres that are not properly adhered to the adhesive.

Once the flock support is obtained, a textile support, for example, it is used to coat a formed workpiece or a workpiece is formed at the same time in order to obtain a final workpiece.

Another way to apply the flock is by applying the adhesive layer directly on the three-dimensional workpiece in order to subsequently project the fibres on said layer, which is called three-dimensional flocking. In this case, the support is the formed workpiece itself.

The application of indicative and/or decorative motifs on this type of flock coatings can be achieved for example by modifying the colour of the fibres applied by dying them prior to their application.

Another way of applying motifs can be by the use of fibres with different geometric characteristics, or the localised application of such fibres on the support, copying the design of the motif to be represented on the support.

Another technique that is known in order to apply motifs on flock coatings consists in engraving the motifs by the action of a laser beam that melts part of the fibres forming the flock, producing different tones between the area on which laser beam has acted and where it has not.

In this case, the effect produced by the different tones obtained is limited by the original colour of the fibres forming the flock support, since the laser beam can only darken the colours by melting the fibres present in the support with its heat. Therefore, in this case the effect obtained is limited to the different tones that can be obtained from a single colour, produced by the variation of the heat applied on said fibres.

There are solutions known in the state of the art to achieve this differentiation effect between the colours of the engraved motif, which consist in the use of a two-layer element made up of an outer or upper layer and an inner or lower layer, such that the colour of the lower layer is different to that of the higher layer.

Thus, the application of a laser beam on the outer or upper layer causes the elimination of part of the material of said upper layer, such that it reveals the lower layer, producing a two-colour effect that allows representing a motif with a specific design. An example of this technique is found in document U.S. Pat. No. 6,633,019.

In this case it is necessary to use an additional layer with a different colour to that of the outer layer of the support, thus achieving the two-colour effect.

The object of the invention is therefore to engrave an indicative and/or decorative motif on an inner flock coating by the action of a laser beam thereupon, producing on said coating at least two areas that can be differentiated by the human eye due to characteristics such as colour, photoluminescence, etc., for example, without having to use additional layers as part of said coating.

DESCRIPTION OF THE INVENTION

In view of the above, the present invention relates to a process for the manufacture of an inner coating for vehicles with an indicative and/or decorative motif, wherein said motif is arranged on a visible side of the inner coating, said process comprising the following steps:

arrangement of a support, application of an adhesive layer over at least part of the support, projection of a number of fibres median by flocking technology over at least part of the adhesive layer in order to achieve a flock layer, where the temperature at which the fibres making up the flock layer are eliminated is less than the degradation temperature of the adhesive making up the adhesive layer, creation of at least part of the motif by the combination of two visibly different areas of the coating, a first area and a second area, such that the first area is made up of part of the flock layer, where said part is visible and such that the second area is made up of at least part of the adhesive layer, where it is visible due to the elimination of part of the flock layer located on the adhesive layer, and where the elimination of part of the flock layer occurs due to an increase in temperature of said part, caused by the action of a laser beam on the flock layer, such that it causes the elimination of at least part of said flock layer, making the adhesive layer located under said part of the flock layer visible, and where the elimination temperature of the fibres making up the flock layer is less than the degradation temperature of the adhesive making up the adhesive layer.

A vehicle is understood as any means of transportation for people or objects such as a car, an aircraft, or a train, for example.

The visible side of the inner coating is the side that is visible to the user when said inner coating is in its assembly position inside the vehicle.

The definition of the motif as being indicative and/or decorative means any graphic expression with a purely decorative function or any other function, such as that of indicating a device inside the vehicle, such as the word "airbag" indicating the location of an airbag, or such as an indicator light on a button activating a mechanism in the vehicle.

The elimination of part of the flock layer is understood as part of the material in the fibres forming the flock layer passing from a solid state to vapour state, either maintaining their original composition or decomposing into other substances.

In certain special cases said material undergoes combustion when vaporised, combustion being the destruction of the material by its combination with O2 when it reaches ignition temperature.

In the particular case of their being combustion, the intensity of the laser beam is such that when applied on the flock layer it causes the fibres forming said layer to reach their ignition temperature in order to cause their combustion.

However, the adhesive forming the adhesive layer, as stated above, remains stable within the range of intensities the laser beam is working in and is therefore capable of maintaining its integrity despite the increase in temperature caused by said laser beam.

Therefore, and as stated above, in all cases the temperature used to eliminate the fibres forming the flock layer is less than degradation temperature of the adhesive forming the adhesive layer.

When using the configuration of the invention it is possible to achieve an engraved motif on the flock coating made up of the combination of at least two visibly different areas, on the one hand the area of the flock layer and on the other hand the area of the adhesive layer. This visual differentiation can be achieved, for example, by using adhesives with a different colour than that of the flock layer, or by using adhesives or optionally by the use of fibres with photoluminescent properties, for example.

In either case, the differentiation between each area making up the motif is visible to the human eye.

Additionally, as a result of the elimination of material from the flock layer, there is a change in texture that also allows differentiating each of these areas by touch.

On the other hand, this visual effect is achieved without having to use additional layers with respect to those forming the flock coating itself, since the adhesive layer is an integral part of this coating, being the element the main function of which is to join together the flock layer and the support.

Additionally, and since the adhesive layer is not eliminated with the heating action of the laser beam, this adhesive causes a barrier effect that protects the materials forming the support underneath said adhesive layer, such as a fabric support or a plastic support.

Therefore, in contrast to what occurs in other conventional flock coatings, the adhesive layer making up the flock coating has a triple function, to fix the fibres that make up the flock layer to the support, to obtain a two-colour effect by the combination of at least two areas, that made up of the adhesive and that made up of the fibres forming the flock layer, and protection against the laser beam for the layers forming the support underneath the adhesive layer.

DESCRIPTION OF THE DRAWINGS

This specification is supplemented with a set of drawings illustrating the preferred embodiment, which are never intended to limit the invention.

FIG. 7 is a schematic view of the steps in the manufacturing process for an inner flock coating for vehicles with an indicative and/or decorative motif by the action of a laser beam.

DETAILED DESCRIPTION OF THE INVENTION

Figure 1:
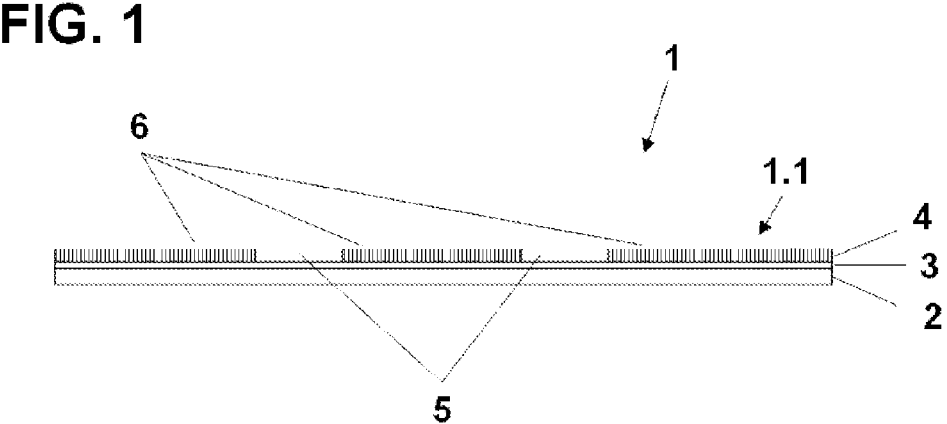
FIG. 1 is a schematic view of a section of an inner flock coating showing a first area and a second area forming the indicative and/or decorative motif.

In view of the above, the present invention relates to a process for the manufacture of an inner flock coating (1) for vehicles with an indicative and/or decorative motif (10), where the inner flock coating (1) is made up of a support (2), an adhesive layer (3) and a flock layer (4) that is adhered to the support (2) via the adhesive layer (3), wherein said motif (10) is located on a visible surface (1.1) of said inner coating (1) and wherein said motif (10) is made up of the combination of at least two areas of the coating (1), a first area (6) and a second area (5), wherein the first area (6) is made up of at least one part of the flock layer (4) where it is visible, and where the second area (5) is made up of part of the adhesive layer (3) where it is visible due to the elimination of part of the flock layer (4) that covers it, and wherein the part of the flock layer (4) that was eliminated was eliminated by an increase in the temperature of said part, caused by the action of a laser beam (9.1). The effect achieved by the combination of at least two types of areas (5 and 6) to draw the motif (10) is a visual effect, that is, the user is capable of differentiating one area from the other and thus of recognising the motif/(10) by means of the visual differentiation of the different types of areas.

Therefore, said first and second area (5 and 6) are visually different, due to the different colours of each area, thus obtaining a two-coloured effect, or due to other properties such as different textures or different tones, for example.

A variation of the invention consists in the use of additives to achieve additional properties, either in the fibres of the flock layer or in the adhesive, with properties such as photoluminescence, fluorescence or an electrochromic effect, for example.

In the specific case of photoluminescence in any of the two areas (5 and 6), the visual differentiation of each of said areas (5 and 6) occurs when the coating is subjected to light radiation, such that one of the areas is capable of emitting light, such that the user can see the motif (10) under specific lighting conditions.

FIG. 1 shows an example of the inner coating (1) of the invention made up of a support (2), which in this particular case has a two-dimensional configuration, two-dimensional being understood as a sheet with two dominant dimensions, width and length; an adhesive layer (3); and a flock layer (4) made up of a set of fibres adhered to the adhesive layer (3) such that they become integral with the support (2) once bound to it.

The support (2) can be made up of materials of different nature, such as plastic components or fabrics, for example. On the other hand, this support may have a two-dimensional configuration, such as a sheet element, for example, or they can have a three-dimensional shape if formed in three dimensions, for example. Examples are shown below of the different types of support according to their physical configuration.

The adhesive layer (3), in a particular case, is made up of an acrylic resin that is applied on the support (2) in a liquid state and is polymerised by applying heat once the fibres have been distributed on the adhesive layer (3).

On the other hand, this adhesive has additives that allow it to differentiate itself from the fibres forming the flock layer (4). These additives can be pigments providing their colour, photoluminescent substances, etc.

Additionally, the adhesive has other additives are allowed to meet the specifications established for visible parts. The elimination of the material forming the flock layer (4) can be carried out by sublimation, decomposition, combustion, etc, as explained above. All of these cases cause an elimination of material that reveals the adhesive layer (3), making it visible.

This elimination of material, especially in the flock layer (4), occur at temperatures high enough to cause the elimination of the part of the flock layer (4) the laser beam (9.1) is aimed at, but low enough as to maintain the integrity of the material forming the adhesive layer (3). More specifically, the range of temperatures that would cause degradation of the adhesive, for the specific case of acrylic resins, would be above 450° C. Therefore, this temperature should not be exceeded at any time in order to maintain the integrity of the adhesive layer (3).

The flock layer (4) is made up of fibres of oil derivatives, such as thermoplastic plastics, and especially polyamide (PA66), polyester (PET), polypropylene (PP), etc., or derivatives of natural substances such as polylactic acid (PLA), polyhydroxyalcanoates (PHAs) or polyhydroxybutirates (PHBs).

The geometric features of the fibres are variable depending on both the visual effect and the feel to be achieved on the coating. The length of the fibres ranges between 0.1 and 20 mm and preferably between 0.8 and 7 mm, and the density ranges between 0.3 and 15 dtex, preferably between 1 and 5 dtex.

The range of temperatures for the elimination of the material in the flock layer (4) ranges between 150° C. and 600° C., preferably between 350° C. and 450° C.

The binding of the fibres forming the flock layer (4) on the support (2) is caused by the partial soaking of one end of such fibres into the adhesive layer (3) located on the support (2).

Having applied the flock layer (4) on the adhesive layer (3) and having completed the drying and cleaning operations, an embossment treatment can be performed on said coating (1) consisting in hot stamping a pattern on said coating in order to achieve different effects on the fibres forming the flock layer.

In order to obtain the motif (10) on the coating, as can be observed in FIG. 1, which shows two different types of areas on the visible side (1.1) of the inner coating (1), these two visually different types of areas are combined, a first area (6) where the flock layer (4) is visible and a second area (5) where the flock layer (4) has been removed, revealing the adhesive layer (3).

Figure 2:
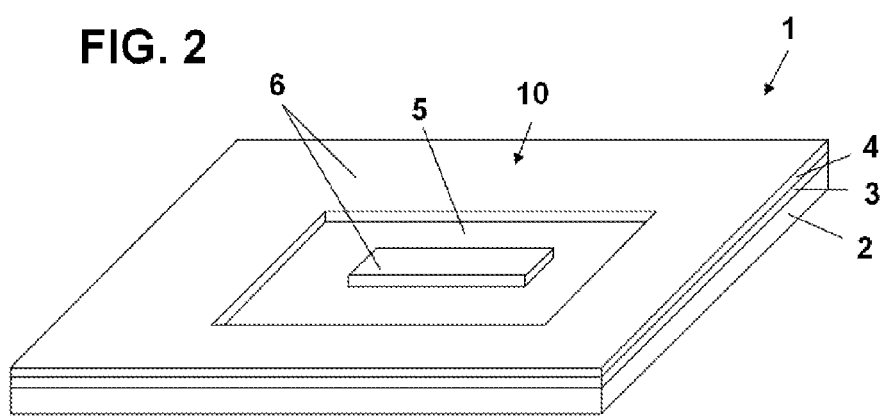
FIG. 2 is a schematic view in perspective or an inner flock coating showing a decorative motif made up of the combination of a first area and a second area.

By the combination of these two different types of area, a first area (6) and a second area (5), we obtain the motif (10) on the inner coating (1), in this case, as can be seen in FIG. 2, which shows a perspective view of the inner coating (1), the motif (10) in this case being decorative. In other cases, this motif (10) can have an indicative function as in the case of the word "airbag" indicating the position of this safety element in the vehicle, or as a photoluminescent indicator for a specific device or simply as a reference position in the vehicle.

The first area (6) making up the motif (10) is made up of at least one part of the flock layer (4), this first area (6) being visible from the visible side (1.1) of the inner coating (1).

Since the adhesive layer (3) is immediately below the flock layer (4), it is possible that part of the adhesive layer (3) may occasionally become noticeable, depending on the density of the flock layer (4), however, in this first area (6) the most visible layer of the coating (1) is the flock layer (4).

The second area (5) making up the motif (10) is made up of part of the adhesive layer (3) where it is visible, due to the elimination of part of the flock layer (4) located on the adhesive layer (3), and where the elimination of that part of the flock layer (4) occurs by an increase in temperature of said part, caused by the action of a laser beam (9.1) on the flock layer (4).

This laser beam (9.1) is applied by means that generate and direct (9) said beam (9.1) such that it causes the elimination of at least part of said flock layer (4), making the adhesive layer (3) below said part of flock layer (4) visible.

Figure 3:
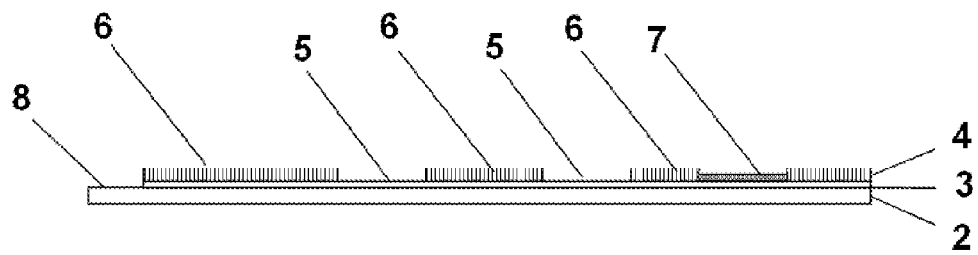
FIG. 3 is a schematic view of a section of a flock coating showing a first area, a second area, a third area and a fourth area forming the indicative and/or decorative motif.

In some cases, the elimination of the fibres of a certain area may not be complete and there may therefore be some remainder of molten material that solidifies in the area the laser beam (9.1) operates in, however, this part is considered negligible with respect to the part of the fibres of the flock layer (4) that has been eliminated. FIG. 3 shows a variation of the invention. In this case it contemplates the possibility of the creation of the motif (10) by the combination of other possible types of areas with the first area (6) and the second area (5) described.

Specifically, in an example represented in FIG. 3, showing four different types of areas, a first area (6), a second area (5), a third area (7) and a fourth area (8).

The first and second areas (5 and 6) have already been described above, and are therefore considered defined.

The third area (7) is made up of the material resulting from having heated the fibres of the flock layer (4) until they melt, but without eliminating them, leaving the adhesive layer at least partially covered by said molten material, caused by an increase in temperature in the fibres by the action of a laser beam (9.1).

Therefore, different effects can be achieved on the flock layer (4) by controlling the intensity of the laser beam (9.1). In this case, where the material forming the layers is melted, the heat received by said fibres, generated by the laser beam (9.1) is less than the heat received by the fibres forming the second area (5) forming the motif (10), where said fibres are eliminated.

The fourth area (8) making up the motif (10), shown in FIG. 3, is formed on the one hand by part of the support (2) on which neither a flock layer (4) or an adhesive layer (3) have been applied. Therefore, the appearance offered by this support (2) contributes, by its combination with the remaining areas forming the motif (10), to establish the final appearance of said motif (10).

Figure 4:
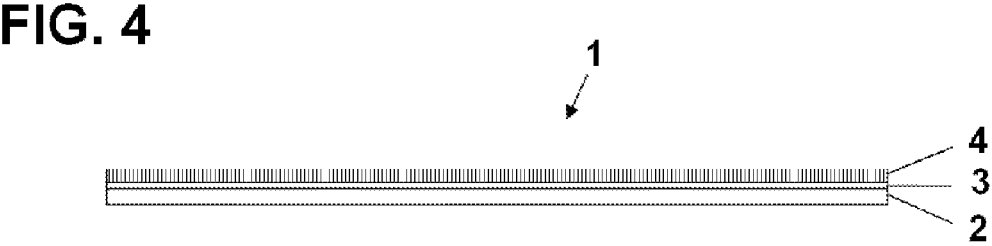
FIG. 4 is a schematic view of a section of an inner flock coating showing a support having a two-dimensional configuration.
Figure 5:
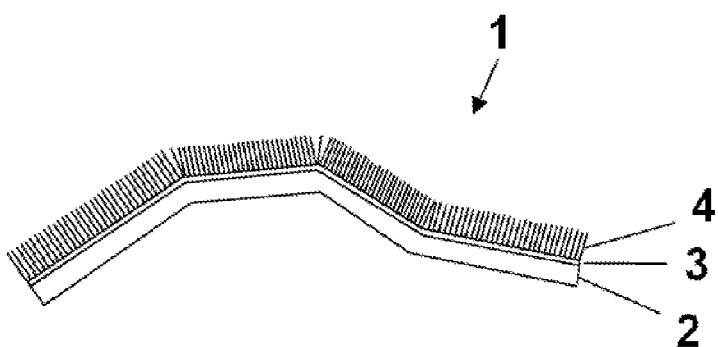
FIG. 5 is a schematic view of a section of an inner flock coating showing a support having a three-dimensional configuration.
Figure 6:
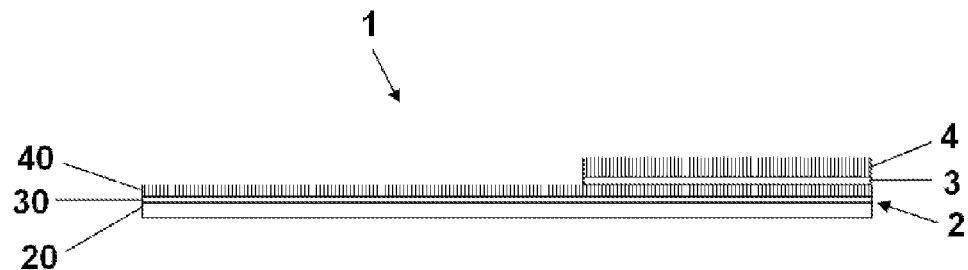
FIG. 6 is a schematic view of a section of an inner flock coating showing a support made up of a flock element and having a two-dimensional configuration.

FIGS. 4, 5 and 6 show examples of the different configurations the support (2) may adopt.

First of all, FIG. 4 shows a support (2) with a configuration having two dominant dimensions, i.e. a two-dimensional configuration in which said means are shaped by a sheet, e.g. of fabric, paper or plastic, i.e. in order to obtain the coating (1), the application of both the adhesive layer (3) and the flock layer (4), as well as the drawing of the motif (10) is carried out on a two-dimensional element.

In this case, in a subsequent stage, the coating (1) obtained can be shaped in order to obtain a coating part for inside a vehicle with a three-dimensional configuration, either by means of its application on a part that has already been shaped, or by its individual shaping or together with the material that will make up the part.

FIG. 5 shows the configuration of a support (2) with a three-dimensional configuration. In this case, both the application of the flock layer (4) and of the adhesive layer (3), as well as the drawing of the motif (10) is carried out on a three-dimensional support.

FIG. 6 shows a third example of the support (2), where said means have a two-dimensional configuration, such as the one shown in the Figure, or a three-dimensional configuration (not shown), and where said support (2) is formed in turn by a second support (20), an adhesive layer (30) and a flock layer (40), joined and superimposed consecutively.

Therefore, in order to make the coating (1), an adhesive layer (3) is applied on the flock layer (40) and then another flock layer (4) is applied such that adhesive layer (3) acts as a connection of the flock layer (4) with the support (2).

Finally, the stages of the manufacturing procedure for the coating of the invention are described, which are represented as a diagram in FIG. 7.

First of all, and in order to produce the coating shown in step a) of the process, a support (2) is needed on which to apply an adhesive layer (3). This adhesive layer (3) is applied upon at least one part of the support (2).

A flock layer (4) is applied below, corresponding with at least part of the adhesive layer (3), and preferably over the entire surface forming said adhesive layer (3).

The application of said flock layer (4) can be carried out, for example, by means of an electrostatic flocking process consisting in the projection of the fibres making up the flock layer (4) through an electrostatic field that orients them, onto an adhesive layer (3) located on a support (2), such that said fibres are perpendicularly arranged with respect to the support.

With this procedure, one of the ends making up said fibres is embedded in the adhesive layer to thus fix its position on the support (2).

The motif is then created, as can be seen in steps b), c) and d) of the process represented in FIG. 7, by the combination of two different areas of the coating (1), a first area (6) and a second area (5).

The first area (6) is formed in turn by part of the flock layer (4).

The second area (5) is made up of part of the adhesive layer (3) where it is visible, due to the elimination of a part of the flock layer (4) located on the adhesive layer (3), and where said elimination of said part of the flock layer (4) is produced by an increase in temperature in said part, caused by the action of a laser beam (9.1) on the flock layer (4), shown in step c) of the procedure, applied by laser beam (9.1) generation and direction means (9), such that it causes the elimination of at least part of said flock layer (4), making the adhesive layer (3) under said part of the flock layer (4) visible.

As described above, the support can have a two-dimensional or a three-dimensional configuration, as shown in FIGS. 4 and 5. On the other hand, the support may be made up of a single layer or by a three-dimensional part, or by a multilayer element such as the one shown in FIG. 6, such as a flocked element.

On the other hand, the motif (10) obtained can be seen by the user, who can differentiate the different shapes making up the motif, either by the different colours of the different areas or by the photoluminescent properties of some of the flock layers (4) or the adhesive layers (3) making up the coating (1), or any visible difference in the trimming.

On the other hand, the motif (10) can be formed by the combination of other areas with the first and the second area (5 and 6) described above. Such as a third area (7) where the material forming the fibres of the flock layer (4) are made to melt, causing a change of tone in the fibres that varies according to the intensity of the laser beam (9.1), or a fourth area made up of part of the support (2) itself on which neither adhesive or fibres have been applied.

Variations in materials, shapes, size and the arrangement of the component elements, described in a non-limiting manner, do not alter the essence of this invention, this being sufficient for its reproduction by an expert.

The invention claimed is:

1. A process for the manufacture of an inner flock coating for vehicles, said process comprising the following steps:
   arrangement of a support;
   application of an adhesive layer over at least part of the support;
   projection of a number of fibres by flocking over at least part of the adhesive layer in order to achieve a flock layer, wherein the melting or combustion temperature of the fibres forming the flock layer is less than the degradation temperature of the adhesive forming the adhesive layer; and
   elimination of a portion of the flock layer located on the adhesive layer by increasing the temperature of said portion of the flock layer located on the adhesive layer with a laser beam positioned above and projected on said portion of the flock layer located on the adhesive layer, thereby creating an indicative, decorative, or indicative and decorative motif located on a visible surface of said inner flock coating, wherein the temperature used to eliminate the portion of the flock layer located on the adhesive layer is between 150° C. and 600° C. and is less than the degradation temperature of the adhesive forming of the adhesive layer, the adhesive forming the adhesive layer remains stable and maintains its integrity despite the increase in temperature caused by the laser beam, and at least part of the motif comprises a combination of at least two visually different areas, a first area formed by part of the flock layer where the flock layer is visible, and a second area formed by a visible portion of the adhesive layer, where the visible portion of the adhesive layer is visible due to the elimination of a portion of the flock layer located on the adhesive layer, wherein the first area is and the second area differ from one another in colour, photoluminescence, fluorescence, electrochromism, or a combination thereof.

2. A process for the manufacture of an inner flock coating for vehicles according to claim 1, further comprising subjecting the motif to light radiation, and wherein the first area is different than the second area due to the adhesive layer or the flock layer being photoluminescent.

3. A process for the manufacture of an inner flock coating for vehicles according to claim 1, wherein the motif is further made up of a third area formed by material resulting from heating the fibres of the flock layer until they reach a molten state.

4. A process for the manufacture of an inner flock coating for vehicles according to claim 1, wherein the motif is made up of a fourth area formed by part of the support.

5. A process for the manufacture of an inner flock coating for vehicles according to claim 1, wherein the support is formed by a two-dimensional element.

6. A process for the manufacture of an inner flock coating for vehicles according to claim 1, wherein the support is formed by a three-dimensional element.

7. A process for the manufacture of an inner flock coating for vehicles according to claim 1, wherein the support is made up of a layer of flock material comprising a second support, a second adhesive layer and a second flock layer applied by flocking.

8. A process for the manufacture of an inner flock coating for vehicles according to claim 1, wherein the temperature used to eliminate the portion of the flock layer located on the adhesive layer is less than 450° C.

9. A process for the manufacture of an inner flock coating for vehicles according to claim 1, wherein the temperature used to eliminate the portion of the flock layer located on the adhesive layer is between 350° C. and 450° C.

10. A process for the manufacture of an inner flock coating for vehicles according to claim 1, wherein the first area is different than the second area due to the adhesive layer or the flock layer being fluorescent.

11. A process for the manufacture of an inner flock coating for vehicles according to claim 1, wherein the first area is different than the second area due to the adhesive layer or the flock layer being electrochromic.

12. A process for the manufacture of an inner flock coating for vehicles, said process comprising the following steps:
arrangement of a support;
application of an adhesive layer over at least part of the support;
projection of a number of fibres by flocking over at least part of the adhesive layer in order to achieve a flock layer, wherein the melting or combustion temperature of the fibres forming the flock layer is less than the degradation temperature of the adhesive forming the adhesive layer;
elimination of a portion of the flock layer located on the adhesive layer by increasing the temperature of said portion of the flock layer located on the adhesive layer with a laser beam positioned above and projected on said portion of the flock layer located on the adhesive layer, thereby creating an indicative, decorative, or indicative and decorative motif located on a visible surface of said inner flock coating, wherein the temperature used to eliminate the portion of the flock layer located on the adhesive layer is between 150° C. and 600° C. and is less than the degradation temperature of the adhesive forming the adhesive layer, the adhesive forming the adhesive layer remains stable and maintains its integrity despite the increase in temperature caused by the laser beam, and at least part of the motif comprises a combination of at least two visually different areas, a first area formed by part of the flock layer where the flock layer is visible, and a second area formed by a visible portion of the adhesive layer, where the visible portion of the adhesive layer is visible due to the elimination of a portion of the flock layer located on the adhesive layer, wherein the first area and the second area differ from one another in colour, photoluminescence, fluorescence, electrochromism, or a combination thereof; and
placement of the inner flock coating in an assembly position inside a vehicle.

13. A process for the manufacture of an inner flock coating for vehicles according to claim 12, wherein the temperature used to eliminate the portion of the flock layer located on the adhesive layer is less than 450° C.

14. A process for the manufacture of an inner flock coating for vehicles according to claim 12, wherein the temperature used to eliminate the portion of the flock layer located on the adhesive layer is between 350° C. and 450° C.

15. A process for the manufacture of an inner flock coating for vehicles according to claim 12, further comprising subjecting the motif to light radiation, and wherein the first area is different than the second area due to the adhesive layer or the flock layer being photoluminescent.

16. A process for the manufacture of an inner flock coating for vehicles according to claim 12, wherein the first area is different than the second area due to the adhesive layer or the flock layer being fluorescent.

17. A process for the manufacture of an inner flock coating for vehicles according to claim 12, wherein the first area is different than the second area due to the adhesive layer or the flock layer being electrochromic.

18. A process for the manufacture of an inner flock coating for vehicles, said process comprising the following steps:
arrangement of a support;
application of an adhesive layer over at least part of the support;
projection of a number of fibres by flocking over at least part of the adhesive layer in order to achieve a flock layer, wherein the melting or combustion temperature of the fibres forming the flock layer is less than the degradation temperature of the adhesive forming the adhesive layer; and
elimination of a portion of the flock layer located on the adhesive layer by increasing the temperature of said portion of the flock layer located on the adhesive layer with a laser beam positioned above and projected on said portion of the flock layer located on the adhesive layer, thereby creating an indicative, decorative, or indicative and decorative motif located on a visible surface of said inner flock coating, wherein the temperature used to eliminate the portion of the flock layer located on the adhesive layer is less than 450° C. and is less than the degradation temperature of the adhesive forming the adhesive layer, the adhesive forming the adhesive layer remains stable and maintains its integrity despite the increase in temperature caused by the laser beam, and at least part of the motif comprises a combination of at least two visually different areas, a first area formed by part of the flock layer where the flock layer is visible, and a second area formed by a visible portion of the adhesive layer, where the visible portion of the adhesive layer is visible due to the elimination of a portion of the flock layer located on the adhesive layer, wherein the first area and the second area differ from one another in colour, photoluminescence, fluorescence, electrochromism, or a combination thereof.

19. A process for the manufacture of an inner flock coating for vehicles according to claim 18, further comprising subjecting the motif to light radiation, and wherein the first area is different than the second area due to the adhesive layer or the flock layer being photoluminescent.

20. A process for the manufacture of an inner flock coating for vehicles according to claim 18, wherein the first area is different than the second area due to the adhesive layer or the flock layer being fluorescent or electrochromic.

* * * * *